US010438385B2

United States Patent
Schaffer et al.

(10) Patent No.: US 10,438,385 B2
(45) Date of Patent: Oct. 8, 2019

(54) GENERATING INK EFFECTS FOR A DIGITAL INK STROKE

(71) Applicant: Microsoft Technology Licensing, LLC, Redmond, WA (US)

(72) Inventors: Simon J. Schaffer, Seattle, WA (US); Travis P. Dorschel, Issaquah, WA (US); Christine M. Johnson, Redmond, WA (US); Craig A. Macomber, Seattle, WA (US); Michael Tang, Seattle, WA (US); Joshua M. Smithrud, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/872,821

(22) Filed: Jan. 16, 2018

(65) Prior Publication Data
US 2019/0096123 A1    Mar. 28, 2019

Related U.S. Application Data

(60) Provisional application No. 62/562,933, filed on Sep. 25, 2017, provisional application No. 62/566,242, filed on Sep. 29, 2017.

(51) Int. Cl.
*G06T 11/20* (2006.01)
*G06F 3/0484* (2013.01)
(Continued)

(52) U.S. Cl.
CPC ........ *G06T 11/203* (2013.01); *G06F 3/03545* (2013.01); *G06F 3/04845* (2013.01);
(Continued)

(58) Field of Classification Search
CPC ............ G06F 3/04845; G06F 3/04883; G06F 3/03545; G06F 17/242; G06T 11/203;
(Continued)

(56) References Cited

U.S. PATENT DOCUMENTS 5,434,959 A * 7/1995 Von Ehr, II ......... G06F 3/04845
345/441
6,268,865 B1 * 7/2001 Daniels ................ G06T 11/001
345/582

(Continued)

OTHER PUBLICATIONS

"Corel® Painter™ 8", Retrieved From <<https://web.archive.org/web/20030805145426/http:/www.corel.com/content/pdf/painter8/tutorials/Liquid_Ink.pdf>>, Aug. 5, 2003, pp. 1-32.
(Continued)

*Primary Examiner* — King Y Poon
*Assistant Examiner* — Vincent Peren
(74) *Attorney, Agent, or Firm* — Talem IP Law, LLP

(57) ABSTRACT

Techniques and systems for generating ink effects for an ink stroke are described. In particular, ink gradients for digital ink strokes are provided. The described techniques allow for inking input to be transformed into a structure in which conventional and unconventional graphics techniques can be applied. A digital ink system can receive an ink stroke having ink stroke information. The outline of the ink stroke can be identified, and the ink stroke information can be transformed into surface information within the outline of the ink stroke. A graphic effect can be applied to the ink stroke using the surface information.

18 Claims, 9 Drawing Sheets

(51) Int. Cl.
  *G06F 3/0488* (2013.01)
  *G06T 3/00* (2006.01)
  *G06T 13/80* (2011.01)
  *G06T 11/60* (2006.01)
  *G06T 15/50* (2011.01)
  *G06T 15/60* (2006.01)
  *G06F 3/0354* (2013.01)

(52) U.S. Cl.
  CPC ........ *G06F 3/04883* (2013.01); *G06T 3/0006* (2013.01); *G06T 3/0093* (2013.01); *G06T 11/60* (2013.01); *G06T 13/80* (2013.01); *G06T 15/506* (2013.01); *G06T 15/60* (2013.01); *G06T 2215/12* (2013.01)

(58) Field of Classification Search
  CPC .......... G06T 11/20; G06T 11/60; G06T 11/40; G06T 11/001; G06T 15/506; G06T 15/60; G06T 13/80; G06T 3/0006; G06T 3/0093; G06T 2215/12; G06K 9/00402; G06K 9/00409; G06K 9/00416
  See application file for complete search history.

(56) References Cited

U.S. PATENT DOCUMENTS

| | | | |
|---|---|---|---|
| 7,158,138 B1 | 1/2007 | Bronskill et al. | |
| 7,427,984 B2 | 9/2008 | Smirnov et al. | |
| 8,487,963 B1* | 7/2013 | Harris | G06T 11/00 345/619 |
| 9,192,874 B2 | 11/2015 | Moll et al. | |
| 2004/0233196 A1* | 11/2004 | Hertzmann | G06T 11/001 345/441 |
| 2007/0268304 A1* | 11/2007 | Hsu | G06T 11/001 345/592 |
| 2008/0266309 A1* | 10/2008 | Sander | G06T 11/001 345/582 |
| 2011/0304643 A1 | 12/2011 | Marison | |
| 2013/0057540 A1* | 3/2013 | Winnemoeller | G06T 15/80 345/419 |
| 2013/0342560 A1* | 12/2013 | Joshi | G06T 11/001 345/592 |
| 2014/0355884 A1* | 12/2014 | Tran | G06K 9/18 382/188 |
| 2015/0347000 A1 | 12/2015 | Ookawara | |
| 2016/0034752 A1 | 2/2016 | Tung | |
| 2016/0232146 A1 | 8/2016 | Su et al. | |
| 2016/0253300 A1 | 9/2016 | Tu et al. | |
| 2017/0139556 A1 | 5/2017 | Josephson | |
| 2017/0212612 A1 | 7/2017 | Zhou | |
| 2017/0236318 A1 | 8/2017 | Ellbogen et al. | |
| 2019/0096100 A1 | 3/2019 | Schaffer et al. | |
| 2019/0096114 A1 | 3/2019 | Kwiatkowski et al. | |

OTHER PUBLICATIONS

"Glitterati", Retrieved From <<https://itunes.apple.com/us/app/glitterati/id410052281?mt=8>>, Oct. 11, 2012, 2 Pages.

"OneNote July roundup", Retrieved From <<https://blogs.office.com/en-us/2016/07/21/onenote-july-roundup/>>, Jul. 21, 2016, 5 Pages.

"Providing Erasers", Retrieved From <<https://msdn.microsoft.com/en-us/library/ms698143(v=vs.85).aspx>>, Aug. 2, 2011, 2 Pages.

Bowden, Zac, "Windows Ink: How to use Screen Sketch", Retrieved From <<https://www.windowscentral.com/windows-ink-how-use-screen-sketch>>, Sep. 26, 2016, 15 Pages.

"Non Final Office Action Issued in U.S. Appl. No. 15/871,923", dated Oct. 1, 2018, 24 Pages.

"Non Final Office Action Issued in U.S. Appl. No. 15/871,928", dated Sep. 11, 2018, 9 Pages.

"International Search Report and Written Opinion Issued in PCT Application No. PCT/US18/039208", dated Sep. 17, 2018, 13 Pages.

"Final Office Action Issued in U.S. Appl. No. 15/871,928", dated Nov. 23, 2018, 8 Pages.

* cited by examiner

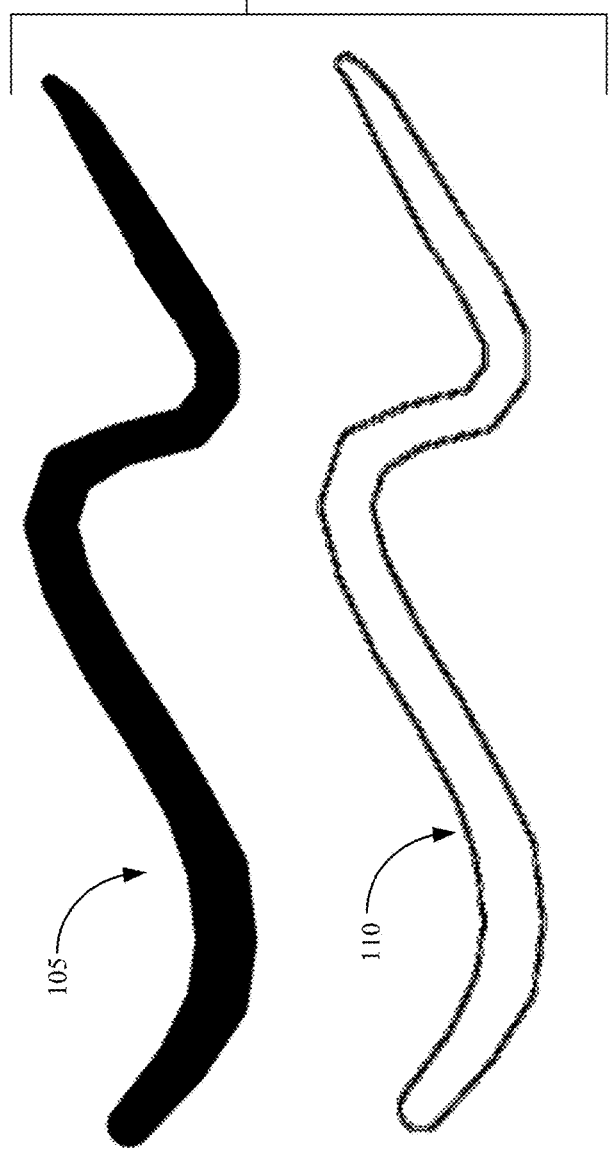
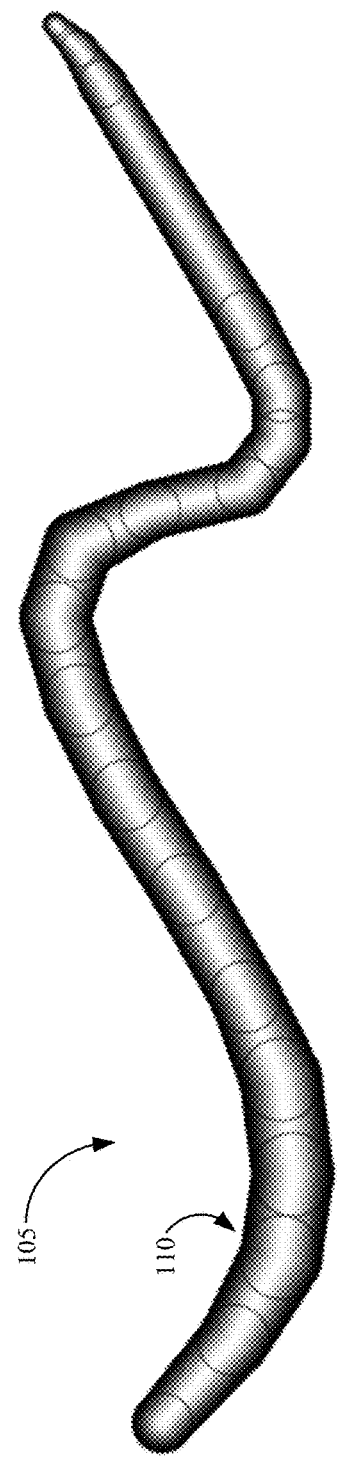
FIG. 1A
FIG. 1B

GENERATING INK EFFECTS FOR A DIGITAL INK STROKE

CROSS REFERENCE TO RELATED APPLICATIONS

This application claims the benefit of U.S. Provisional Application Ser. No. 62/562,933, filed Sep. 25, 2017 and U.S. Provisional Application Ser. No. 62/566,242 filed Sep. 29, 2017.

BACKGROUND

Content creation applications such as notebook applications, word processing applications, spreadsheet applications, and presentation applications are useful tools for generating and curating content. These and other content creation applications are increasingly including "inking" functionality that lets users input content and interact with the application (and content created therein) through using a pen or stylus (and sometimes fingers or other objects) in a manner evoking a pen on paper. Digital ink can imitate real writing utensils such as pens, pencils or paintbrushes, or it can be used to create visual effects that have no real-world analog. A wide variety of ink effects are continually desired.

BRIEF SUMMARY

Techniques and systems for generating ink effects for an ink stroke are described. In particular, ink gradients for digital ink strokes are provided.

The described techniques allow for inking input to be transformed into a structure in which conventional and unconventional graphics techniques can be applied.

A digital ink system can receive an ink stroke having ink stroke information. The outline of the ink stroke can be identified, and the ink stroke information can be transformed into surface information within the outline of the ink stroke. A graphic effect can be applied to the ink stroke using the surface information. Surface information can be information related to the surface of an ink stroke, and can be used to produce a three-dimensional effect or an edge-related effect (i.e., an ink effect affecting the edges of an ink stroke).

In some cases, the ink stroke information may be transformed by determining a gradient of a set of points within the outline of the ink stroke. The gradient is a smooth pattern that is created from the collection of edge distance values. The gradient of the set of points can be determined by calculating, for each point, a distance from the point to a nearest edge on the outline of the ink stroke to generate an edge distance value.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 1A, 1B, 1C, and 1D illustrate example scenarios of generating ink effects for an ink stroke.

DETAILED DESCRIPTION

Figure 1C:
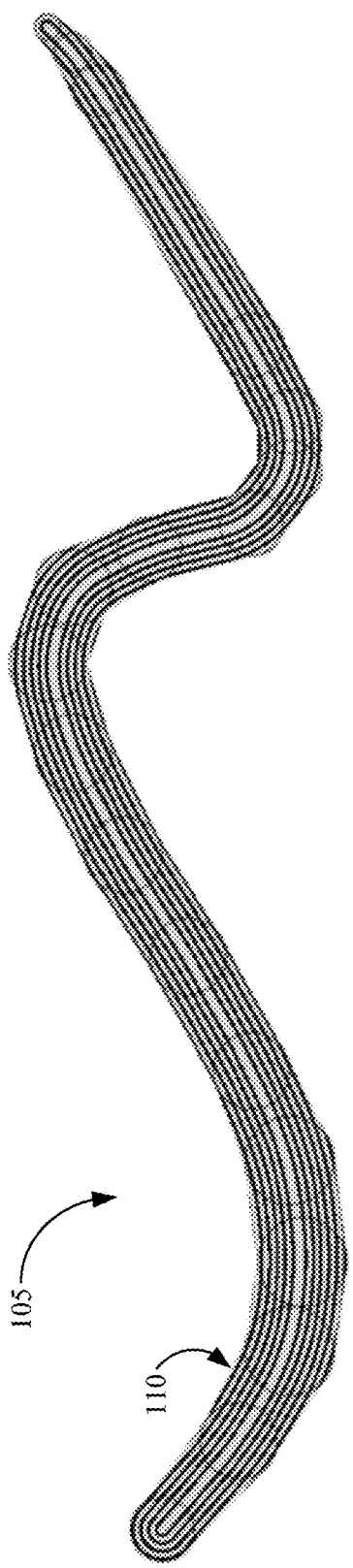

Techniques and systems for generating ink effects for an ink stroke are described. In particular, ink gradients for digital ink strokes are provided.

The described techniques allow for inking input to be transformed into a structure in which conventional and unconventional graphics techniques can be applied.

A digital ink system can receive an ink stroke having ink stroke information. The outline of the ink stroke can be identified, and the ink stroke information can be transformed into surface information within the outline of the ink stroke. A graphic effect can be applied to the ink stroke using the surface information.

In some cases, the ink stroke information may be transformed by determining a gradient of a set of points within the outline of the ink stroke. The gradient is a smooth pattern that is created from the collection of edge distance values. The gradient of the set of points can be determined by calculating, for each point, a distance from the point to a nearest edge on the outline of the ink stroke to generate an edge distance value. Surface information can be information related to the surface of an ink stroke, and on which a three-dimensional effect or an edge-related effect can be applied.

It should be understood when reference is being made to calculating a distance from a point to a nearest edge on the outline of the ink stroke (when generating an edge distance value), the edge distance value may be the approximate distance from one point to the nearest edge. The approximate distance may be used to maintain first-order continuity and avoid visual discontinuities or glitches when applying a graphic effect.

The described techniques are applicable for any application that supports "inking" or "digital ink", which refers to the mode of user input where a stylus or pen (or even user finger on a touch screen or pad or possibly a mouse) is used to capture handwriting in its natural form.

A digitizer generally provides a set of coordinates on a grid that can be used to convert an analog motion into discrete coordinate values. A digitizer may be laid under or over a screen or surface that can capture the movement of a finger, pen, or stylus (e.g., the handwriting or brush strokes of a user). Depending on the features of the digitizer, ink stroke information such as pressure, speed of motion between points, and direction of motion can be collected.

Ink stroke information refers to a set of properties and point data that a digitizer captures that represent the coordinates and properties of a "marking". It can be the set of data that is captured in a single pen down, up, or move sequence. The set of data can include parameters such as, but not limited to, position, a beginning of the stroke, an end of the stroke, the pressure of the stroke, the tilt (e.g., of a pen) for the stroke (can also be referred to as the azimuth), the direction of the stroke, the time and timing of the stroke between discrete coordinates along the path of the stroke, and the color of the 'ink'. It should be understood that some of the ink stroke data may be metadata on the ink stroke itself, and some of the ink stroke data may be metadata per ink point.

The ink stroke information of an ink stroke can include a set of ink points, as well as a mathematical center-line comprising a set of ink segments that connect the ink points. The ink points can be represented as a nib shape. Nib shape refers to the shape of the "pen" that a user is drawing with. The nib shape may be, but is not limited to, a circle, an ellipse, or a rectangle. An "ink point" of an ink stroke can include the ink point and the shape of the nib; and an ink segment of the ink stroke can include the entire geometry of the nib shape used. A "point" of an ink stroke can include a rasterized point within the outline of the ink stroke. For example, the point of an ink stroke can include a pixel within the outline of the ink stroke.

An "ink effect" refers to a graphic effect applied to an ink stroke. A "graphic effect" refers to any technique used to render a three-dimensional object. A graphic effect can include, for example, a reflection effect, a lighting effect, and a shadow effect.

FIGS. 1A, 1B, 1C, and 1D illustrate example scenarios of generating ink effects for an ink stroke. An ink stroke 105 drawn with a circular nib shape is shown. The ink stroke 105 includes several ink points with changing ink point size and has a variable width. The ink stroke 105 may have a variable size because of speed, pressure, or angle at which the ink stroke is drawn.

Referring to FIG. 1A, an example representation of the ink stroke 105 is shown. The ink stroke 105 may be received as inking input during an inking session of a content creation application, such as a whiteboard application. As previously described, the ink stroke 105 can include ink stroke information, such as the coordinates on the input device where the ink input occurred and pressure information indicating the amount of pressure applied at each of these coordinates for the inking input. After receiving the ink stroke 105, an outline of the ink stroke 105 can then be identified, for example as outline 110.

Referring to FIG. 1B, the ink stroke information of the ink stroke 105 can be transformed into surface information within the outline 110 of the ink stroke 105.

The ink stroke information can be transformed by determining a gradient for a set of points within the outline of the ink stroke 105. The gradient can be determined by calculating, for each point in the set of points, a distance from the point to a nearest edge on the outline of the ink stroke 105 to generate an edge distance value. As previously described, the gradient is a smooth pattern created from a collection of the edge distance values and the edge distance values can be approximate distances.

In the example of FIG. 1B, a representation of the gradient of the edge distance values are shown. The darkness of the color of each point in the ink stroke 105 represents how close the point is to the outline 110 of the ink stroke 105. In this example, the darker the color, the closer the point is to the outline 110 of the ink stroke 105.

Referring to FIG. 1C, contour lines for edge distance values within the outline 110 of the ink stroke 105 are shown. It should be understood that FIG. 1C is a visual aid to show how the edge distance values behave. As can be seen, as the width of the ink stroke 105 changes, more or fewer contour lines are included within the outline of the ink stroke 105. Each contour line can be a curve connecting points within the outline 110 of the ink stroke 105 having the same particular value for the edge distance value.

Figure 1D:
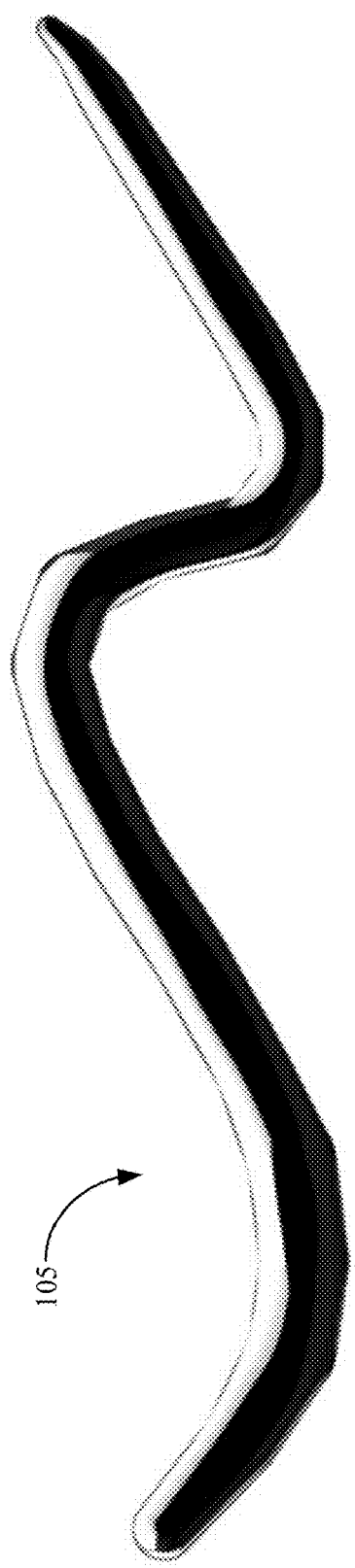

Referring to FIG. 1D, a graphic effect can be applied to the ink stroke 105. Advantageously, the ink information of ink stroke 105 is transformed into surface information represented in FIG. 1B on which conventional and unconventional graphics techniques can then be applied, resulting, for example, in an ink effect as shown in FIG. 1D.

A variety of graphic effects may be applied to the ink stroke 105. In the example of FIG. 1D, an environment map (e.g., the spherical environment map shown in FIG. 4A) is sampled to render the ink stroke 105 with a three-dimensional appearance and a reflective surface. Additional graphic effects will be discussed in more detail later.

Artifacts in the ink effect may occur when there are cusps in the ink stroke edges. To avoid these artifacts, first-order continuity of the edge distance values can be maintained when sampling the gradient during applying the graphic effects.

Figure 2:
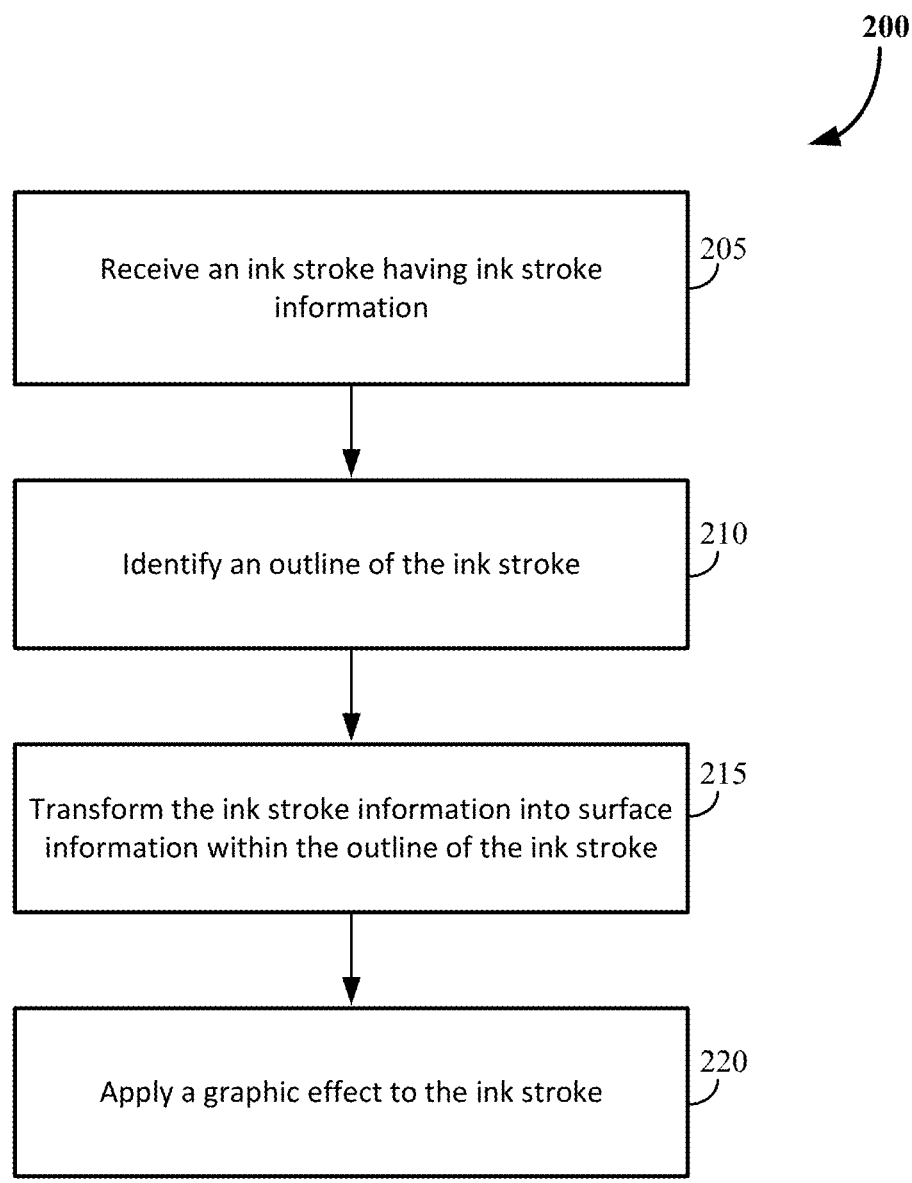
FIG. 2 illustrates an example process flow diagram for a method for generating ink effects for an ink stroke.
Figure 3A:
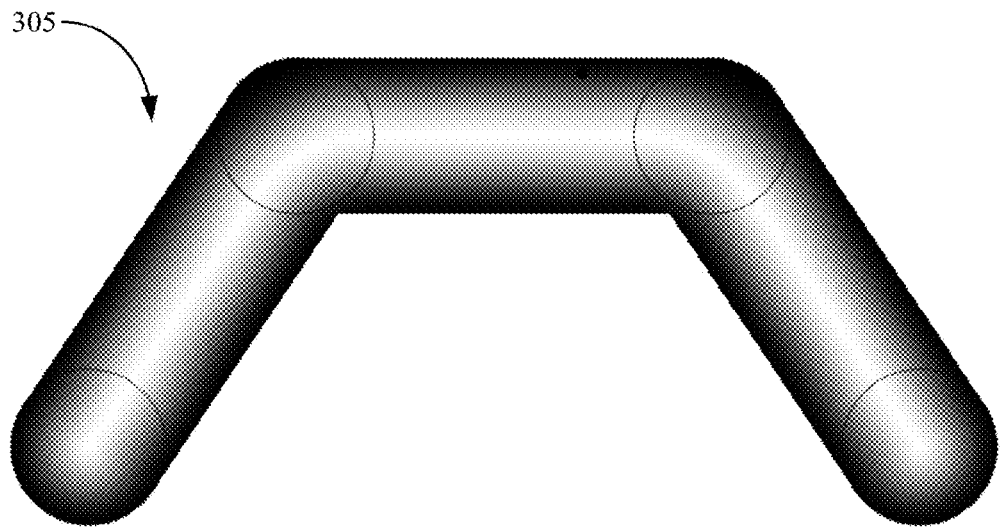
FIGS. 3A and 3B illustrate example representations of transforming ink stroke information into surface information.
Figure 3B:
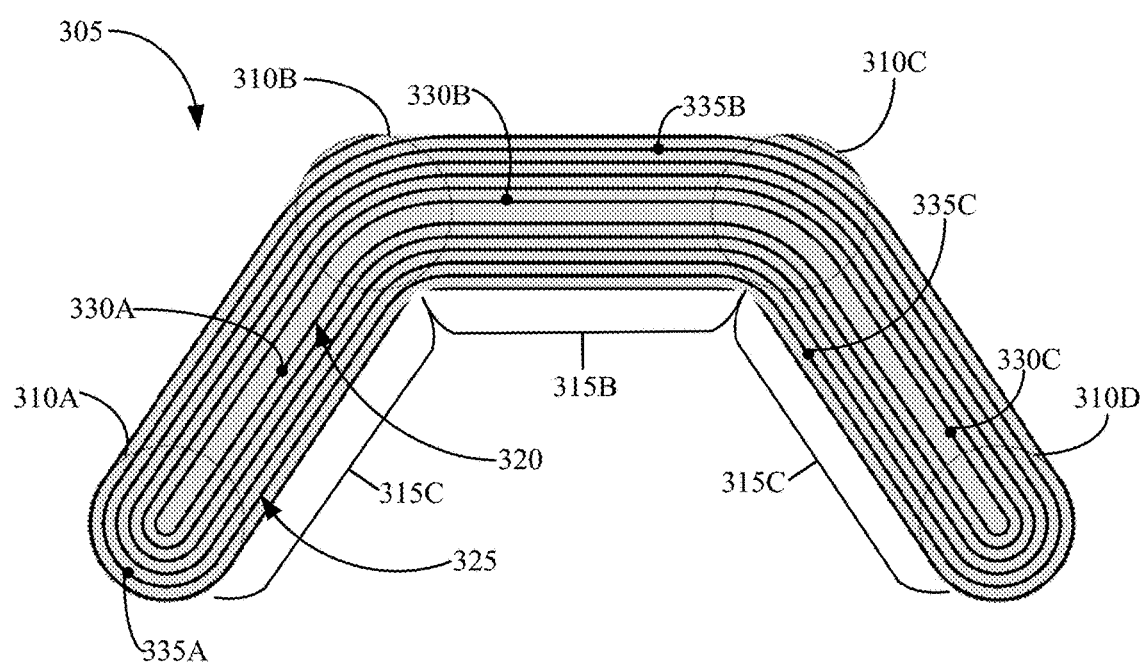

FIG. 2 illustrates an example process flow diagram for a method of generating ink effects for an ink stroke; and FIGS. 3A and 3B illustrate example representations of transforming ink stroke information into surface information. Process 200 of FIG. 2 includes operations 205, 210, 215 and 220. In FIGS. 3A and 3B, an ink stroke 305 that includes four ink points (e.g., ink point 310A, ink point 310B, ink point 310C, and ink point 310D) and three ink segments (e.g., ink segment 315A, ink segment 315B, and ink segment 315C) is shown for simplification.

Process 200 of FIG. 2 begins with the digital ink system receiving (205) an ink stroke 305. As previously described, the ink stroke 305 can include ink stroke information. The ink stroke information may include parameters such as, but not limited to, position, a beginning of the ink stroke, an end of the ink stroke, the pressure of the ink stroke, the tilt for the ink stroke, the direction of the ink stroke, the time and timing of the ink stroke between discrete coordinates along the path of the ink stroke, and the color of the 'ink'.

The digital ink system can identify (210) the outline (not shown) of the ink stroke 305 and transform (215) the ink stroke information into surface information within the outline of the ink stroke 305. In some cases, the ink stroke information can be transformed (215) by determining a gradient for a set of points within the outline of the ink stroke 305.

Referring to FIG. 3A, the gradient can be determined for the set of points by calculating a distance from each point in the set of points to a nearest edge on the outline of the ink stroke 305 to generate an edge distance value. In some cases, the set of points within the outline of the ink stroke 305 may include each rasterized point that makes up the ink stroke 305.

In the example of FIG. 3A, a representation of the gradient of the edge distance values are shown. The darkness of the color of each point in the ink stroke 305 refers how close the point is to the outline of the ink stroke 305. In this example, the darker the color, the closer the point is to the outline of the ink stroke 305.

Referring to FIG. 3B, contour lines (e.g., contour line 320 and contour line 325) representing a set of points whose edge distance values are the same are shown. It should be understood that FIG. 3B is a visual aid to show how the edge distance values behave.

Each contour line is a curve connecting points within the outline of the ink stroke 305 where the edge distance value has the same particular value. Therefore, any point on the contour line (e.g., contour line 320 and contour line 325) has the same edge distance value, no matter which ink segment the point is located in. For example, on contour line 320, point 330A in ink segment 315A, point 330B in ink segment 315B, and point 330C in ink segment 315C have the same edge distance values. In addition, on contour line 325, point 335A in ink segment 315A, point 335B in ink segment 315B, and point 335C in ink segment 315C have the same edge distance values.

Returning to FIG. 2, once the ink stroke information is transformed (215) into surface information, the digital ink system can apply (220) a graphic effect to the ink stroke 305 using the surface information. A variety of graphic effects that can be applied to the ink stroke 305 and can include conventional and unconventional computer graphics techniques. For example, a graphic effect may be applied in which the ink stroke appears to have some "height" on the page.

In some cases, applying the graphic effect can include applying an edge-related effect to the ink stroke. As previously described, an edge-related effect is an ink effect applied to the edges of an ink stroke. In one example, a pencil material that has feathered edges may be applied to simulate graphite on paper. In another example, ink effects that have outlines, wavy, or zigzagged edges may be applied to the ink stroke.

In yet another example, a marker seeping effect may be applied to the ink stroke. With the marker seeping effect, the marker can appear to be bleeding into the paper around the edges of the ink stroke.

In another example, a watercolor brush effect may be applied to the ink stroke. With the watercolor brush effect, paint may collect and appear more saturated at the edges of the ink stroke.

In some cases, applying the graphic effect can include creating a curved height map for the ink stroke based on the edge distance value of each point in the set of points. As the curved height map can be used to store values for use in three-dimensional computer graphics techniques, creating a curved height map allows for generating ink effects with three-dimensional appearances. The curved height map may be created using any mapping function known in the art.

A normal vector can be determined for each point based on the created curved height map. A normal vector refers to a vector which is perpendicular to the surface of the created curved height map at a given point. The normal vector may be used in numerous three-dimensional rendering effects.

In one case, the normal vector can be used to sample an environment map for the ink stroke. Using the normal vector to sample the environment map allows for rendering the ink stroke with a reflective appearance based on the sampled environment map.

The normal vector may be used in a variety of lighting effects in which the ink stroke can be rendered with a three-dimensional effect and a lighting effect. In one example, the normal vector may be used to generate a reflection for the ink stroke. In this example, the ink stroke may be rendered with a three-dimensional appearance and the reflection. In another example, the normal vector may be used to generate a shadow for the ink stroke. In this example, the ink stroke may be rendered with a three-dimensional appearance and the shadow.

Figure 4A:
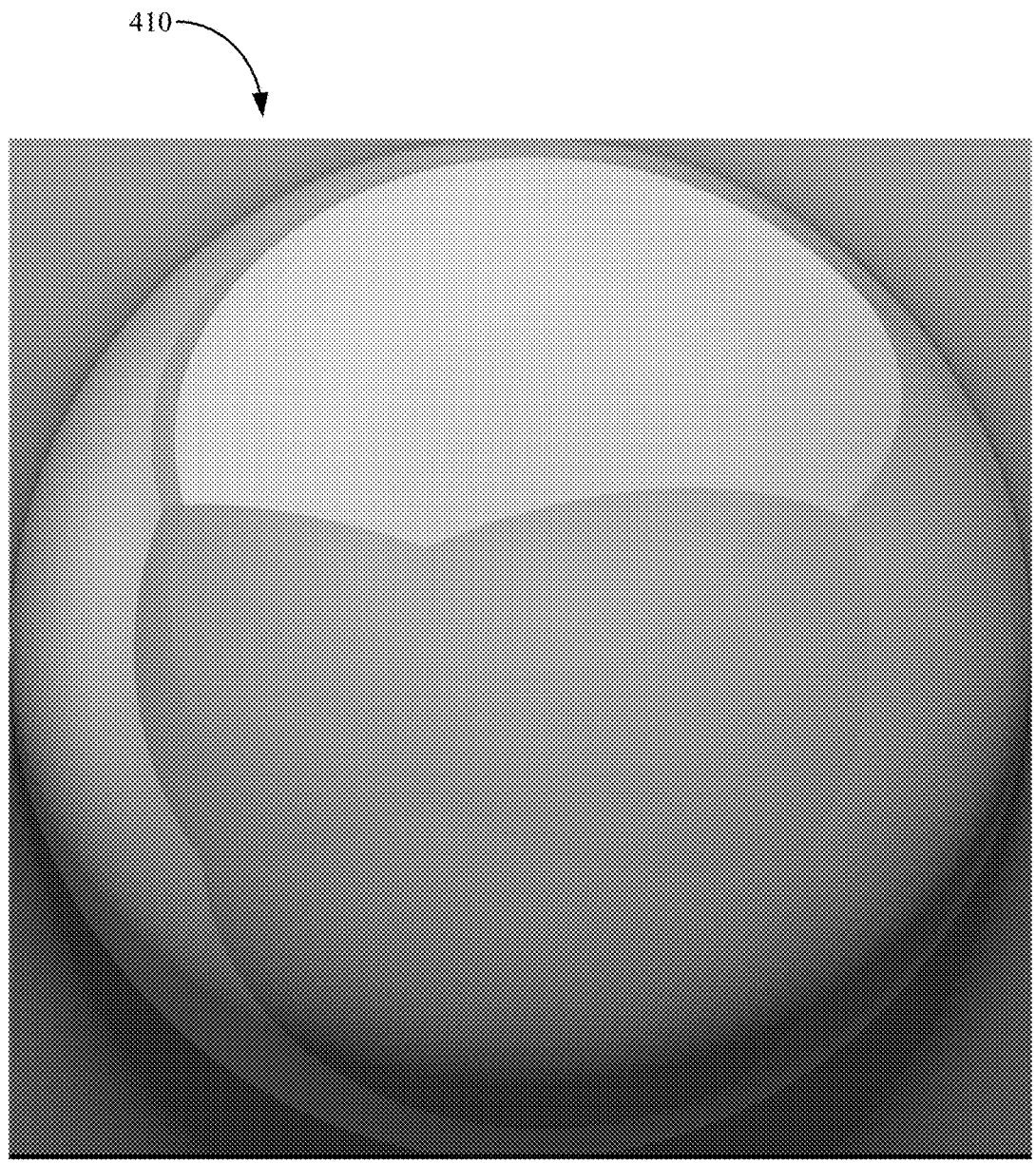
FIGS. 4A, 4B, and 4C illustrate example scenarios of generating ink effects for an ink stroke.
Figure 4B:
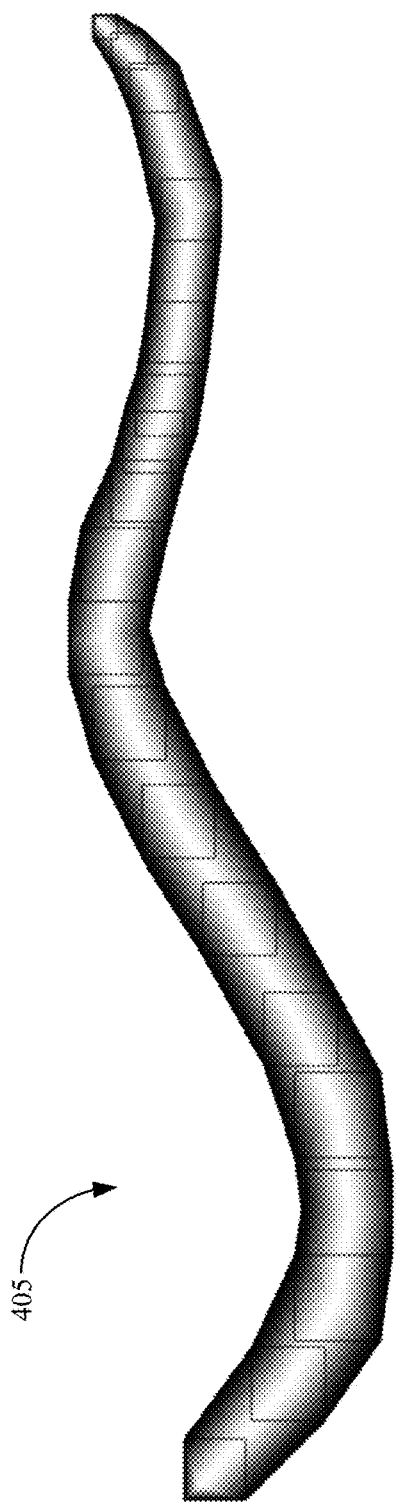
Figure 4C:
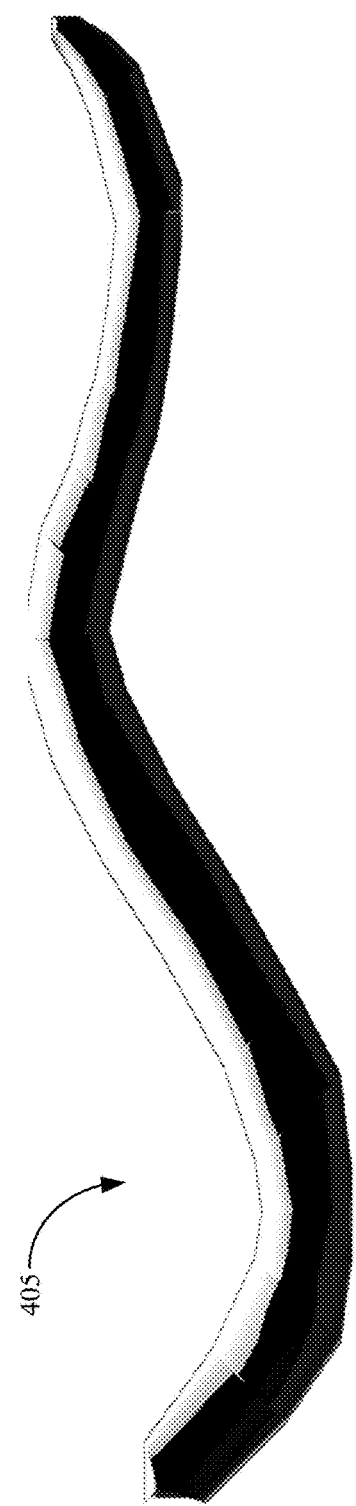

FIGS. 4A, 4B, and 4C illustrate example scenarios of generating ink effects for an ink stroke. An ink stroke 405 drawn with a rectangular nib shape is shown. The ink stroke 405 includes several ink points with changing ink point size and has a variable width. The ink stroke 405 may have a variable size because of speed, pressure, or angle at which the ink stroke is drawn. The two-dimensional ink stroke 405 can be transformed into a three-dimensional object in which three-dimensional effects can be applied Referring to FIG. 4A, an environment map 410 is shown. The environment map 410 is a texture that can be used to approximate reflective surfaces. In the example of FIG. 4A, the environment map 410 is an example of a spherical environment map, in which a single texture contains the image of the surroundings as reflected on a mirror ball.

Referring to FIG. 4B, ink stroke information of the ink stroke 405 can be transformed into surface information within an outline (not shown) of the ink stroke 405.

As previously described, the ink stroke information of the ink stroke 405 can be transformed by determining a gradient for a set of points within the outline of the ink stroke 405. In the example of FIG. 4B, a representation of the gradient of the edge distance values for ink stroke 405 is shown.

Referring to FIG. 4C, a graphic effect is applied to the ink stroke 405. As previously described, a curved height map can be constructed for the ink stroke 405 based on the gradient (e.g., the collection of edge distance values for each point of the set of points within the outline of the ink stroke 405). A normal vector can be determined for each point based on the created curved height map and used to sample an environment map for the ink stroke 405. In the example of FIG. 4C, the environment map 410 of FIG. 4A is sampled and the ink stroke 405 is rendered with a three-dimensional appearance based on the environment map 410.

In some cases, the calculated edge distance values may not maintain first-order continuity. As previously described, when first-order continuity is not maintained, artifacts may appear in the graphic effect. In the example of FIG. 4C, first-order continuity is not maintained. As can be seen, bands occur in the graphic effect where there are cusps in the edges.

Figure 5:
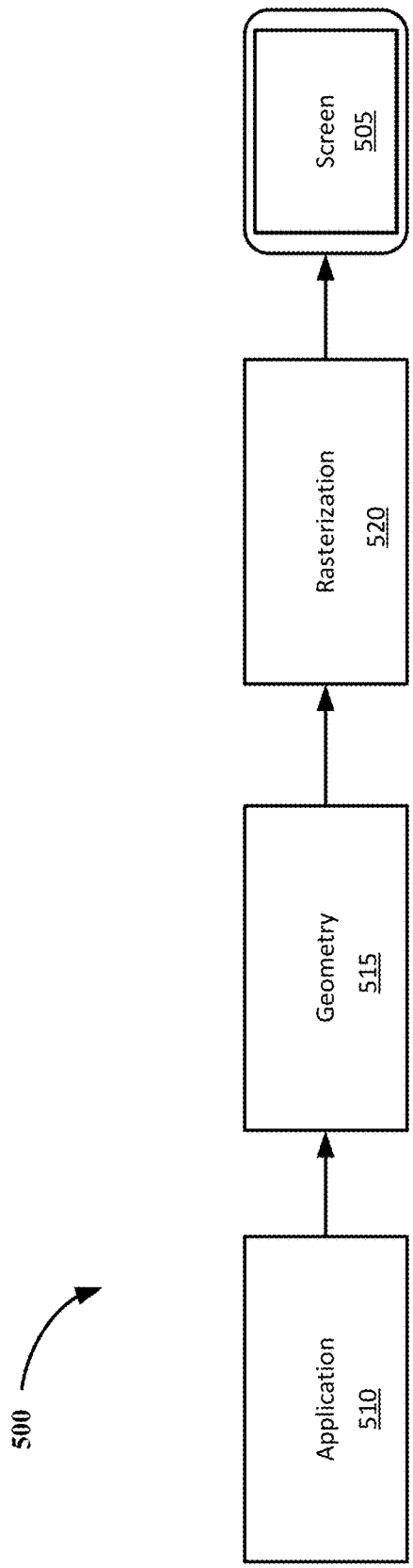
FIG. 5 illustrates an example graphics pipeline.

FIG. 5 illustrates an example graphics pipeline. Referring to FIG. 5, a graphics pipeline 500 is shown. The graphics pipeline 500 includes the steps a graphics system needs to perform to render content to a two-dimensional screen (e.g., screen 505). The graphics pipeline 500 can be divided into three main parts, including application 510, geometry 515, and rasterization 520.

Figure 6:
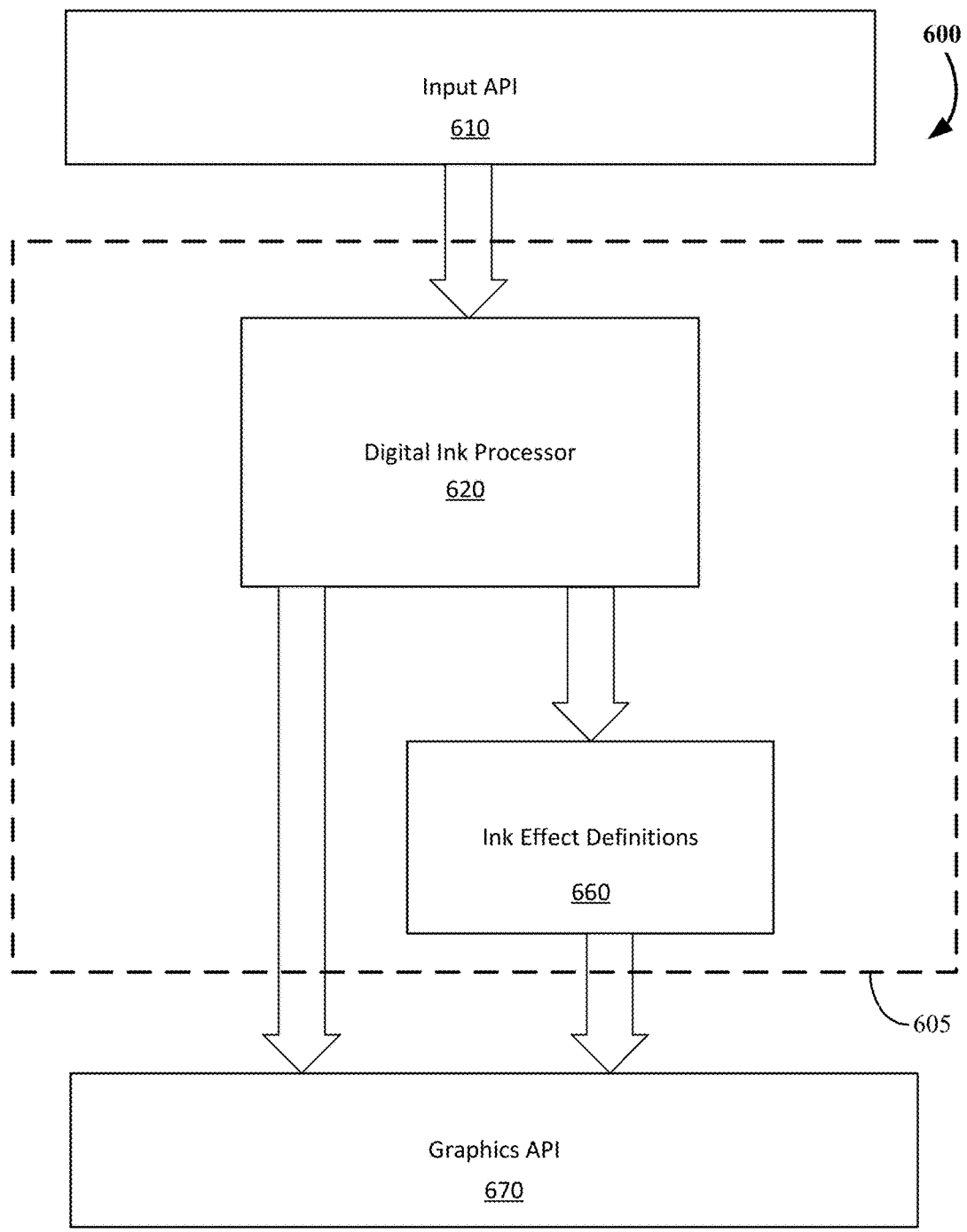
FIG. 6 illustrates a block diagram of a system enabled to accept ink inputs and apply effects to the ink objects in a digital ink system.

FIG. 6 illustrates a block diagram of a system 600 enabled to accept ink inputs and apply effects to the ink objects in a digital ink system, represented by dashed line 605. In one or more embodiments, the digital ink system 605 is implemented as an application (or a program of the operating system) that provides digital ink support to other applications (or programs of the operating system). The digital ink system 605 optionally includes an application programming interface (API) allowing the applications or other programs to interact with the functionality provided by the digital ink system 605. Alternatively, the digital ink system 605 can be implemented in an application and provide digital ink support for that application but not for other applications. Alternatively, the digital ink system 605 can be implemented as a combination thereof. For example, some functionality of the digital ink system 605 can be implemented in an application (or a program of the operating system) that provides digital ink support to other applications or programs, and other functionality of the digital ink system 605 can be implemented in the individual applications to which the digital ink system 605 provides support.

The digital ink system 605 processes the inputs received from the input application program interface (API) 610 (i.e., pointer inputs), and passes them for rendering to the graphics API 670, which in turn will pass the graphics of the digital ink system 605 (including ink objects) to an output device, such as, for example, a computer monitor or smartphone display. For example, the ink points can be sent to a rendering layer of the digital ink system 605, which then calls a graphics card driver API.

An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API implementing component. The API is generally a set of programming instructions and standards for enabling two or more applications to communicate with each other.

Figure 8:
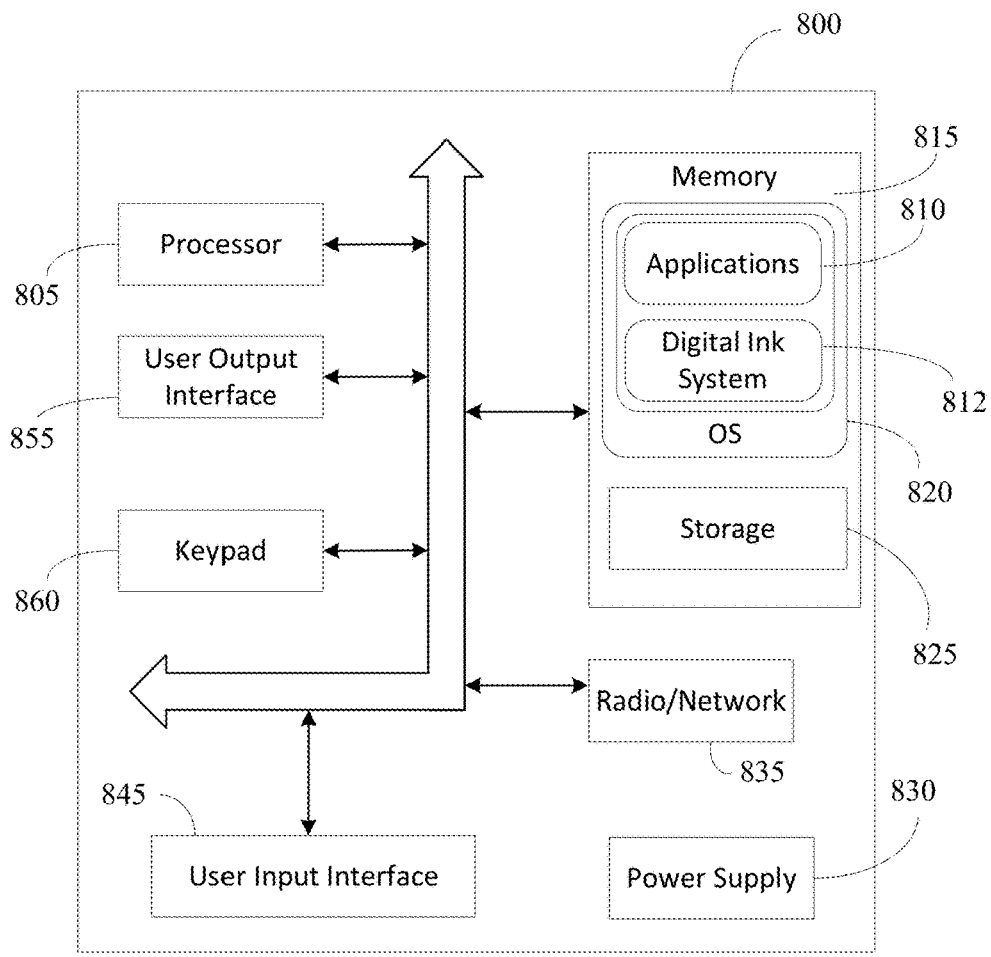
FIG. 8 shows a block diagram illustrating components of a computing device used in some embodiments.

The system 600 can be part of a computing device such as described with respect to FIG. 8, and may receive pointer inputs from input devices such as mice, keyboards, remote controls, and the like, or from natural user input (NUI) methods including those relying on speech recognition, touch and stylus recognition, gesture recognition both on screen and adjacent to the screen, air gestures, head and eye tracking, voice and speech, vision, touch, hover, gestures, and machine intelligence. Pointer inputs are those inputs that define a user's point of interaction within a graphical user interface, such as by a cursor represented within a given program or application and associated with a given input device. Inputs may be interpreted by the input API 610 for use in the digital ink system 605 as digital ink input. A user may signal to the system 600 that ink input is desired, as opposed to other styles of input, by selecting an ink input user interface (UI) element, using a particular input device, or contextually based on a position of a pointer in the digital ink system 605. For example, a user may use an ink input stylus on a touch screen to indicate that inking input is desired (as opposed to positional input via a mouse device), inking input may be enabled in a canvas area of a content creation application, or inking input may be enabled when a user actuates a mouse button (as opposed to positional input when the mouse button is unactuated). When the user has indicated that ink input is desired, the input API 610 receives the inputs from the input devices, and transmits coordinates and pressures (if available on a touch-based device) and other metadata to the digital ink system 605. The other metadata may include, but is not limited to: a device identifier (e.g., stylus one, stylus two), primary or secondary input (e.g., mouse button one or two, stylus nib or "eraser"), velocity of input, authoring mode of when input is received (e.g., editing mode, presentation mode, textbox input, freeform input), user-defined settings within the digital ink system 605, etc.

Input from the input API 610 is received by an ink stroke processor 620, which can interface with the graphics pipeline described with respect to FIG. 5. The ink stroke processor 620 can perform process 200. Ink stroke data can be passed to an application and through the graphics pipeline to an operating systems graphics API 670, for example, after creating geometries to be associated with the ink stroke based on drawing parameters. The drawing parameters may also indicate an ink effect to apply to the stroke or options for the ink effect. The ink stroke processor 620 uses these inputs to create the geometry of the stroke as it will be seen in the GUI. These geometries are passed to the graphics API 670 and may include an ink effect definition 660, when an ink effect has been selected by a user, so that the user can see the ink effect applied to the stroke while the user makes that stroke in the GUI, for example, seeing the "ink" flowing from a stylus into the GUI or three-dimensional effect such as shown in FIGS. 1D and 4C.

The application can receive the ink stroke data, and the ink stroke data can be stored within the document's framework, for example, as an object in an extensible markup language (XML) hierarchy or a JavaScriptObjectNotation (JSON) representation.

The ink effect definitions 660 define additional graphical effects that are applied to the geometries of the strokes shown in the GUI. These effects may be shown in various layers and various behaviors that are set by the user. The definitions include image files (e.g., bitmap, GIF (graphics interchange format), JPEG (joint photographic experts group), PNG (portable network graphic)) as well as color gradient (defining various colors to use in series with a stroke). In some aspects, animated images, such as animated GIFs, may be used as the image files for ink effect definitions 660 so that an animated effect. such as, for example, a flash, sparkle, wave, fade, pulse, etc., may be applied to the ink object.

The graphics API 670 handles the geometries and rendered graphical effects so that they will be displayed according to the display devices associated with the system 600. The geometries and ink effect definitions 660 are converted to pixel values appropriate for the user's display device and any overlay effects are provided. For example, for a given geometry and ink effect definition, the graphics API 670 may render the ink object according to a first way (having x pixels with various hues and luminosities) when the ink object is displayed on a first display device but render the ink object according to a second way (having y pixels with various hues and luminosities) on a second display device, such as, for example, when a user views a presentation on a laptop monitor and switches display to a projector with a different resolution and color properties.

Figure 7:
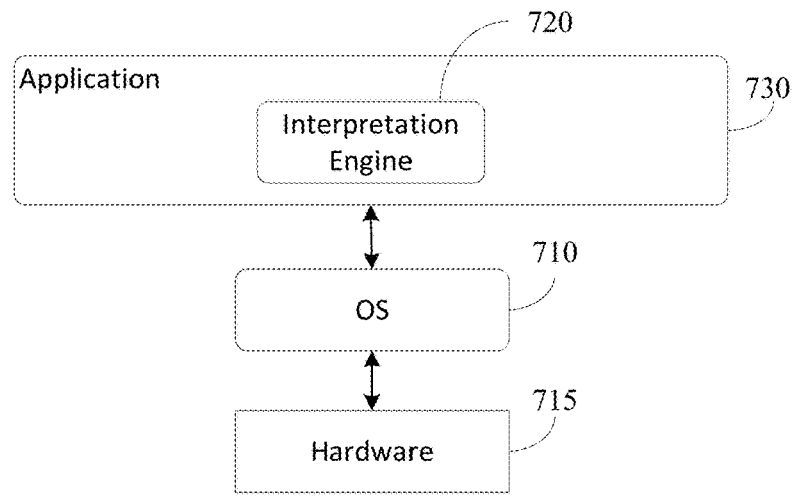
FIG. 7 shows a block diagram illustrating architecture for a computing device used in some embodiments.

An illustrative architecture for a user computing device is provided with reference to FIGS. 7 and 8.

Referring to FIG. 7, the architecture for the user computing device can include a device operating system (OS) 710. The device OS 710 manages user input functions, output functions, storage access functions, network communication functions, and other functions for the device. The device OS 710 may be directly associated with the physical resources of the device or running as part of a virtual machine backed by underlying physical resources. According to many implementations, the device OS 710 includes functionality for recognizing user gestures and other user input via the underlying hardware 715.

An interpretation engine 720 of an application 730 running on the device OS 710 listens (e.g., via interrupt, polling, and the like) for user input event messages from the device OS 710. The UI event messages can indicate a panning gesture, flicking gesture, dragging gesture, or other gesture on a touchscreen of the device, a tap on the touch screen, digital ink input, keystroke input, or other user input (e.g., voice commands, directional buttons, trackball input). The interpretation engine 720 translates the UI event messages into messages understandable by the application.

FIG. 8 shows a block diagram illustrating components of a computing device used in some embodiments. Referring to FIG. 8, system 800 represents a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 800 may be incorporated to implement a particular computing device.

System 800 includes one or more processors 805 that processes data according to instructions of one or more application programs 810, and/or operating system 820. Examples of processors 805 include general purpose central processing units (CPUs), graphics processing units (GPUs), application specific processors, and logic devices, as well as any other type of processing device, combinations, or variations thereof. Processor 805 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor), network connectivity components (e.g., including Radio/network interface 835), and user input interface 845 components.

The one or more application programs 810, including digital ink system 812 may be loaded into memory 815 and run on or in association with the operating system 820. In some cases, digital ink system 812 may be included as part of the one or more application programs 810. Device operating systems generally control and coordinate the functions of the various components in the computing device, providing an easier way for applications to connect with lower level interfaces like the networking interface 835 and some components of user input interface 845 or user output interface 855. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 8, can be thought of as additional, nested groupings within the operating system space, each containing an OS, application programs, and APIs.

Memory 815 may comprise any computer readable storage media readable by the processor 805 and capable of storing software 810 the application 810, OS 820, and digital ink system 812.

Memory 815 may include volatile and nonvolatile memory (such as storage 825), removable and non-removable media implemented in any method or technology for storage of information, such as computer readable instructions, data structures, program modules, or other data. Examples of storage media of memory 815 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory, propagated signal.

Memory 815 may be implemented as a single storage device but may also be implemented across multiple storage devices or sub-systems co-located or distributed relative to each other. Memory 815 may include additional elements, such as a controller, capable of communicating with processor 805. Memory 815 may include multiple buffers.

System 800 has a power supply 830, which may be implemented as one or more batteries and/or an energy harvester (ambient-radiation, photovoltaic, piezoelectric, thermoelectric, electrostatic, and the like). Power supply 830 may further include an external power source, such as an AC adapter or a powered docking cradle that supplements or recharges the batteries.

System 800 may also include a radio/network interface 835 that performs the function of transmitting and receiving radio frequency communications. The radio/network interface 835 facilitates wireless connectivity between system 800 and the "outside world," via a communications carrier or service provider. Transmissions to and from the radio/network interface 835 are conducted under control of the operating system 820, which disseminates communications received by the radio/network interface 835 to application programs 810 and vice versa.

The radio/network interface 835 allows system 800 to communicate with other computing devices, including server computing devices and other client devices, over a network.

The system can further include a user interface system with user input interface 845 and user output interface 855, which may include input/output (I/O) devices and components that enable communication between a user and the system 800. User input interface 845 can include input devices such as a mouse, track pad, keyboard, a touch device for receiving a touch gesture from a user, a motion input device for detecting non-touch gestures and other motions by a user, a microphone for detecting speech, and other types of input devices and their associated processing elements capable of receiving user input. For inclusion of the inking, the user input interface 845 at least includes a touch-based user input interface or a digitizing pen used in place of or as part of the touch-based user input interface. A touch-based user input interface can include a touchscreen and/or surface with sensing components for a digitizer.

The user output interface 855 may also include output devices such as display screen(s), speakers, haptic devices for tactile feedback, and other types of output devices. In certain cases, the input and output devices may be combined in a single device, such as a touchscreen display which both depicts images and receives touch gesture input from the user.

Visual output may be depicted on the display in myriad ways, presenting graphical user interface elements, text, images, video, notifications, virtual buttons, virtual keyboards, or any other type of information capable of being depicted in visual form.

The user interface system may also include user interface software and associated software (e.g., for graphics chips and input devices) executed by the OS 820 in support of the various user input and output devices. The associated software assists the OS 820 in communicating user interface hardware events to application programs using defined mechanisms. The user interface system including user interface software may support a graphical user interface, a natural user interface, or any other type of user interface. Certain aspects of the described digital ink system 812 and the process 200 may include or interface with the user interface software.

Embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

By way of example, and not limitation, computer-readable storage media may include volatile and non-volatile memory, removable and non-removable media implemented in any method or technology for storage of information such as computer-readable instructions, data structures, program modules or other data. Examples of computer-readable storage media include volatile memory such as random access memories (RAM, DRAM, SRAM); non-volatile memory such as flash memory, various read-only-memories (ROM, PROM, EPROM, EEPROM), phase change memory, magnetic and ferromagnetic/ferroelectric memories (MRAM, FeRAM), and magnetic and optical storage devices (hard drives, magnetic tape, CDs, DVDs). As used herein, in no case does the term "storage media" consist of transitory propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims subject to any explicit definitions and disclaimers regarding terminology as provided above.

What is claimed is:

1. A method for generating ink effects for an ink stroke, comprising:
   receiving an ink stroke with a variable width and curvature, the ink stroke having ink stroke information;
   identifying an outline of the ink stroke;
   transforming the ink stroke information into surface information within the outline of the ink stroke by:
      determining a gradient of a set of points within the outline of the ink stroke, wherein the determining of the gradient of the set of points comprises, for each point, calculating a distance from the point to a nearest edge on the outline of the ink stroke to generate an edge distance value,
      wherein the edge distance value for at least one point of the set of points is an approximate distance from the at least one point to the nearest edge on the outline of the ink stroke due to the variable width and the curvature of the ink stroke, wherein the approximate distance is used to maintain first-order continuity in the gradient; and
   applying a graphic effect to the ink stroke using the surface information including the gradient having the first-order continuity.

2. The method of claim 1, wherein the applying of the graphic effect to the ink stroke comprises creating a curved height map for the ink stroke based on the edge distance value of each point of the set of points.

3. The method of claim 2, further comprising determining a normal vector for each point of the set of points based on the created curved height map.

4. The method of claim 3, further comprising:
   using the normal vector for each point of the set of points to sample an environment map for the ink stroke; and
   rendering the ink stroke with a three-dimensional appearance based on the sampled environment map.

5. The method of claim 3, further comprising:
   using the normal vector for each point of the set of points to generate a reflection for the ink stroke; and
   rendering the ink stroke with a three-dimensional appearance and the reflection.

6. The method of claim 3, further comprising:
   using the normal vector for each point of the set of points and the curved height map to generate a shadow for the ink stroke; and
   rendering the ink stroke with a three-dimensional appearance and the shadow.

7. The method of claim 3, further comprising:
   using the normal vector for each point of the set of points to generate a lighting effect for the ink stroke; and
   rendering the ink stroke with a three-dimensional appearance and the lighting effect.

8. One or more computer-readable storage media having instructions stored thereon that when executed by a processor, direct the processor to at least:
   receive an ink stroke with a variable width and curvature, the ink stroke having ink stroke information;
   identify an outline of the ink stroke;
   transform the ink stroke information into surface information within the outline of the ink stroke by:
      determining a gradient of a set of points within the outline of the ink stroke, wherein the determining of the gradient comprises, for each point, calculating a distance from the point to a nearest edge on the outline of the ink stroke to generate an edge distance value,
      wherein the edge distance value for at least one point of the set of points is an approximate distance from the at least one point to the nearest edge on the outline of the ink stroke due to the variable width and the curvature of the ink stroke, wherein the approximate distance is used to maintain first-order continuity in the gradient; and
   apply a graphic effect to the ink stroke using the surface information including the gradient having the first-order continuity.

9. The media of claim 8, wherein the instructions to apply the graphic effect to the ink stroke using the surface information, direct the processor to:
   create a curved height map for the ink stroke based on the edge distance value of each point of the set of points.

10. The media of claim 9, wherein the instructions further direct the processor to determine a normal vector for each point of the set of points based on the created curved height map.

11. The media of claim 10, wherein the instructions further direct the processor to:
   use the normal vector for each point of the set of points to sample an environment map for the ink stroke; and
   render the ink stroke with a three-dimensional appearance based on the sampled environment map.

12. The media of claim 10, wherein the instructions further direct the processor to:
   use the normal vector for each point of the set of points to generate a reflection for the ink stroke; and
   render the ink stroke with a three-dimensional appearance and the reflection.

13. The media of claim 10, wherein the instructions further direct the processor to:
   use the normal vector for each point of the set of points to generate a shadow for the ink stroke; and
   render the ink stroke with a three-dimensional appearance and the shadow.

14. The media of claim 10, wherein the instructions further direct the processor to:

use the normal vector for each point of the set of points to generate a lighting effect for the ink stroke; and render the ink stroke with a three-dimensional appearance and the lighting effect.

15. A system comprising:

a processor; and one or more computer-readable storage media having instructions stored thereon that when executed by the processor, direct the processor to at least:

receive an ink stroke with a variable width and curvature, the ink stroke having ink stroke information;

identify an outline of the ink stroke;

transform the ink stroke information into surface information within the outline of the ink stroke by:

determining a gradient of a set of points within the outline of the ink stroke, wherein the determining of the gradient comprises, for each point, calculating a distance from the point to a nearest edge on the outline of the ink stroke to generate an edge distance value, wherein the edge distance value for at least one point of the set of points is an approximate distance from the at least one point to the nearest edge on the outline of the ink stroke due to the variable width and the curvature of the ink stroke, wherein the approximate distance is used to maintain first-order continuity in the gradient; and apply a graphic effect to the ink stroke using the surface information including the gradient having the first-order continuity.

16. The system of claim 15, wherein the instructions to apply the graphic effect to the ink stroke using the surface information, direct the processor to:

create a curved height map for the ink stroke based on the edge distance value of each point of the set of points.

17. The system of claim 16, wherein the instructions further direct the processor to:

determine a normal vector for each point of the set of points based on the created curved height map;

use the normal vector for each point of the set of points to sample an environment map for the ink stroke; and render the ink stroke with a three-dimensional appearance based on the sampled environment map.

18. The system of claim 15, wherein the graphic effect is an edge-related effect.

* * * * *